(12) United States Patent
Jung et al.

(10) Patent No.: US 11,888,773 B2
(45) Date of Patent: Jan. 30, 2024

(54) METHOD AND APPARATUS FOR REPORTING BEAM INFORMATION IN NEXT-GENERATION COMMUNICATION SYSTEM

(71) Applicant: Samsung Electronics Co., Ltd., Suwon-si (KR)

(72) Inventors: Euichang Jung, Seoul (KR); Suyoung Park, Uiwang-si (KR); Suha Yoon, Yongin-si (KR); Sunghyuk Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/957,319

(22) PCT Filed: Oct. 12, 2018

(86) PCT No.: PCT/KR2018/012049
§ 371 (c)(1),
(2) Date: Jun. 23, 2020

(87) PCT Pub. No.: WO2019/139225
PCT Pub. Date: Jul. 18, 2019

(65) Prior Publication Data
US 2020/0351054 A1 Nov. 5, 2020

(30) Foreign Application Priority Data
Jan. 12, 2018 (KR) .......................... 10-2018-0004554

(51) Int. Cl.
*H04L 5/00* (2006.01)
*H04B 7/06* (2006.01)
(Continued)

(52) U.S. Cl.
CPC .......... *H04L 5/0048* (2013.01); *H04B 7/0621* (2013.01); *H04W 72/21* (2023.01); *H04W 74/0833* (2013.01)

(58) Field of Classification Search
CPC ... H04L 5/0048; H04L 5/0023; H04L 5/0053; H04W 74/0833; H04W 72/0413;
(Continued)

(56) References Cited

U.S. PATENT DOCUMENTS

| 9,247,557 | B2 | 1/2016 | Liao et al. |
| 2013/0235742 | A1* | 9/2013 | Josiam ................. H04B 7/0695 370/252 |

(Continued)

FOREIGN PATENT DOCUMENTS

| WO | 2017/196019 A2 | 11/2017 |
| WO | 2017/204931 A1 | 11/2017 |

OTHER PUBLICATIONS

Huawei et al., 'Handling of resources for beam failure recovery', R2-1712563, 3GPP TSG RAN WG2 Meeting #100, Reno, Nevada, USA, Nov. 17, 2017.

(Continued)

*Primary Examiner* — Redentor Pasia
(74) *Attorney, Agent, or Firm* — Jefferson IP Law, LLP

(57) ABSTRACT

The present disclosure relates to a communication technique for convergence of IoT technology and a 5G communication system for supporting a higher data transfer rate beyond a 4G system, and a system therefor. The present disclosure can be applied to intelligent services (e.g., smart homes, smart buildings, smart cities, smart or connected cars, health care, digital education, retail business, and services associated with security and safety) on the basis of 5G communication technology and IoT-related technology. The present disclosure relates to a method and an apparatus for reporting beam (Continued)

failure-related information during beam measurement and reporting.

16 Claims, 11 Drawing Sheets

(51) Int. Cl.
    *H04W 74/08* (2009.01)
    *H04W 72/21* (2023.01)
(58) Field of Classification Search
    CPC ..... H04W 72/04; H04B 7/088; H04B 7/0621; H04B 7/0695
    See application file for complete search history.

(56) References Cited

U.S. PATENT DOCUMENTS

| | | | |
|---|---|---|---|
| 2017/0346534 A1 | 11/2017 | Islam et al. | |
| 2018/0132252 A1* | 5/2018 | Islam | H04W 72/046 |
| 2018/0227035 A1* | 8/2018 | Cheng | H04B 7/0695 |
| 2018/0227899 A1* | 8/2018 | Yu | H04W 72/0413 |
| 2018/0249526 A1* | 8/2018 | Nagaraja | H04B 7/088 |
| 2018/0255607 A1* | 9/2018 | Nagaraja | H04L 5/0048 |
| 2018/0278467 A1* | 9/2018 | John Wilson | H04W 72/046 |
| 2018/0279284 A1* | 9/2018 | Wang | H04W 72/0406 |
| 2018/0279287 A1* | 9/2018 | John Wilson | H04B 7/088 |
| 2018/0367374 A1* | 12/2018 | Liu | H04L 5/0023 |
| 2019/0052337 A1* | 2/2019 | Kwon | H04W 72/085 |
| 2019/0053294 A1* | 2/2019 | Xia | H04B 7/0695 |
| 2019/0082332 A1* | 3/2019 | Raghavan | H04B 7/0695 |
| 2019/0082334 A1* | 3/2019 | Nagaraja | H04W 74/04 |
| 2019/0110281 A1* | 4/2019 | Zhou | H04W 76/19 |
| 2019/0116605 A1* | 4/2019 | Luo | H04B 7/024 |
| 2019/0132851 A1* | 5/2019 | Davydov | H04W 72/541 |
| 2019/0141640 A1* | 5/2019 | Abedini | H04W 52/146 |
| 2019/0149207 A1* | 5/2019 | Wang | H04W 76/19 455/522 |
| 2019/0356371 A1* | 11/2019 | Osawa | H04W 88/02 |
| 2019/0356379 A1* | 11/2019 | Takeda | H04B 7/088 |
| 2020/0059398 A1* | 2/2020 | Pan | H04L 5/0048 |
| 2020/0127726 A1* | 4/2020 | Gao | H04W 24/10 |
| 2020/0336195 A1* | 10/2020 | Hu | H04W 24/10 |
| 2021/0185754 A1* | 6/2021 | Da Silva | H04W 76/19 |
| 2022/0078678 A1* | 3/2022 | Amuru | H04W 36/0072 |
| 2022/0110109 A1* | 4/2022 | Tsai | H04W 72/27 |
| 2023/0066772 A1* | 3/2023 | Myung | H04W 74/0808 |

OTHER PUBLICATIONS

Panasonic, 'UL resource configuration for the beam failure recovery', R2-1712407, 3GPP TSG RAN WG2 Meeting #100, Reno, Nevada, USA, Nov. 16, 2017.
ZTE Corporation et al, R2-1713406, 3GPP TSG RAN WG2 Meeting #100, Reno, Nevada, USA, Nov. 16, 2017.
'WF on beam reporting' Qualcomm, NTT DoCoMo, Ericsson, ZTE, Huawei, AT&T, Samsung, LGE, Intel, Nokia, NSB, Sharp, R1-1719064, Oct. 13, 2017.
National Instruments, On remaining aspects of beam recovery, R1-1714180, 3GPP TSG-RAN WG1 Meeting #90, Prague, Czech Republic, Aug. 12, 2017.
Institute for Information Industry (III), Discussion on beam failure failure recovery mechanism, R1-1708874, 3GPP TSG-RAN WG1 Meeting #89, Hangzhou, China, May 5, 2017.
Zte et al., Discussion on beam recovery, R1-1719534, 3GPP TSG RAN WG1 Meeting #91, Reno, USA, Nov. 18, 2017.
Korean Office Action dated Feb. 25, 2022, issued in Korean Patent Application No. 10-2018-0004554.
Interdigital, Inc., Remaining issues on beam recovery, R1-1718483, 3GPP TSG RAN WG1 Meeting #90bis, Prague, Czech Republic, Oct. 3, 2017.
NTT DOCOMO, Inc., Discussion on NR RLM and RLF, R1-1708446, 3GPP TSG RAN WG1 Meeting #89, Hangzhou, P.R. China, May 6, 2017.
Korean Notice of Allowance dated Aug. 10, 2022, issued in Korean Patent Application No. 10-2018-0004554.
Institute for Information Industry (III): "Discussion on beam failure recovery mechanism", 3GPP Draft; R1-1708874_Discussion on Beam Failure Recovery Mechanism, 3rd Generation Partnership Project (3GPP), Mobile Competence Centre ; 650, Route Des Lucioles ; F-06921 Sophia-Antipolis Cedex ; F, vol. RAN WG1, No. Hangzhou, China; May 15-May 19, 2017, May 14, 2017 (May 14, 2017), XP051274057, Retrieved from the Internet: URL:http://www.3gpp.org/ftp/Meetings_3GPP_SYNC/RAN1/Docs/.
LG Electronics: "Discussion on beam failure recovery", 3GPP Draft; R1-1719908 Beam Recovery, 3rd Generation Partnership Project (3GPP), Mobile Competence Entre ; 650, Route Des Lucioles F-06921 Sophia-Antipolis Cedex ; France vol. RAN WG1, No. Reno, USA; Nov. 27-Dec, 1, 2017 Nov. 18, 2017(Nov. 18, 2017), XP051369621, Retrieved from the Internet: URL:http://www.3gpp.org/ftp/tsg%5Fran/WG1%5FRL1/TSGR1%5F91/.
Huawei et al.: "Beam Failure Recovery Design Details", 3GPP Draft; R1-1715468, 3rd Generation Partnership Project (3GPP), Mobile Competence Centre ; 650, Route Des Lucioles ; F-06921 Sophia-Antipolis Cedex ; France, vol. RAN WG1, No. Nagoya, Japan; Sep. 18-Sep. 21, 2017 Sep. 17, 2017 (Sep. 17, 2017), XP051338936,, Retrieved from the Internet: URL:http://www.3gpp.org/ftp/ Meetings 3GPP_SYNC/RAN1/Docs/.
Samsung: "Discussion on beam recovery procedure", 3GPP Draft; R1-1707954 Discussion on Beam Recovery Procedure, 3rd Generation Partnership Project (3GPP), Mobile Competence Centre ; 650, Route Des Lucioles ; F-06921 Sophia-Antipolis Cedex ; France vol. RAN WG1, No. Hangzhou; May 15-May 19, 2017 May 14, 2017 (May 14, 2017), XP051273152, Retrieved from the Internet: URL http://www.3gpp.org/ftp/Meetings_3GPP_SYNC/RAN1/Docs/.
NTT Docomo: "Views on beam recovery", 3GPP Draft; R1-1718193_Beam Recovery, 3rd Generation Partnership Project (3GPP), Mobile Competence Centre ; 650, Route Des Lucioles ; F-06921 Sophia-Antipolis Cedex ; France vol. RAN WG1, No. Prague, CZ; Oct. 9-Oct. 13, 2017 Oct. 8, 2017 (Oct. 8, 2017), XP051341375, Retrieved from the Internet: URL:http://www.3gpp.org/ftp/Meetings_3GPP_SYNC/RAN1/Docs/.
Huawei et al: "Beam failure recovery design details", 3GPP Draft; R1-1717302, 3rd Generation Partnership, Project (3GPP), Mobile Competence Centre ; 650, Route Des Lucioles ; F-06921 Sophia-Antipolis Cedex ; France vol. RAN WG1, No. Prague, Czech Republic; Oct. 9-Oct. 13, 2017 Oct. 8, 2017 (Oct. 8, 2017), XP051340492, Retrieved from the Internet: URL:http://www.3gpp.org/ftp/Meetings_3GPP_SYNC/RAN1/Docs/.
Extended European Search Report dated Feb. 3, 2021, issued in European Application No. 18899688.8.

* cited by examiner

FIG. 1

|  | Format 0 | Format 1 | Format 2 | Format 3 | Format 4 |
|---|---|---|---|---|---|
| Waveform | CP-OFDM | DFT-S-OFDM | CP-OFDM | DFT-S-OFDM | DFT-S-OFDM (Pre-DFT) |
| # of symbols | Up to 2 | 4-14 | Up to 2 | 4-14 | 4-14 |
| # of PRBs | 1 | 1 | Configurable | | 1 |
| # of UCI bits | ≤ 2 | ≤ 2 | 1 ~ FFS | 1 ~ FFS | 1 ~ FFS |
| UCI type | 1-bit/2-bit HARQ-ACK and/or SR | | HARQ-ACK with/without SR + CSI feedback | | |
| Encoding | Seq. selection | Seq. modulation | RM for UCI bits ≤ 11, Polar for UCI bits > 11 | | |
| Modulation | - | BPSK/QPSK | QPSK | | |
| DMRS ratio | - | ~ 1/2 | 1/3 | Variable | |
| Freq. hopping | Enable/disable by UE-specific RRC signaling | | | | |
| Location in time domain | Symbol index 0 - 13 | Symbol index 0 - 10 | Symbol index 0 - 13 | Symbol index 0 - 10 | Symbol index 0 - 10 |
| Location in freq. domain | Within a UE's BWP | | | | |

FIG. 2A
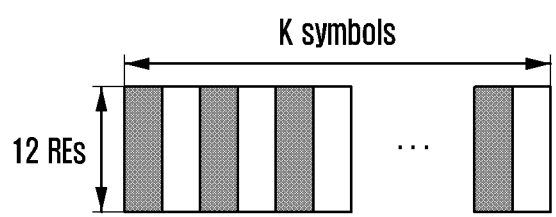
(a)
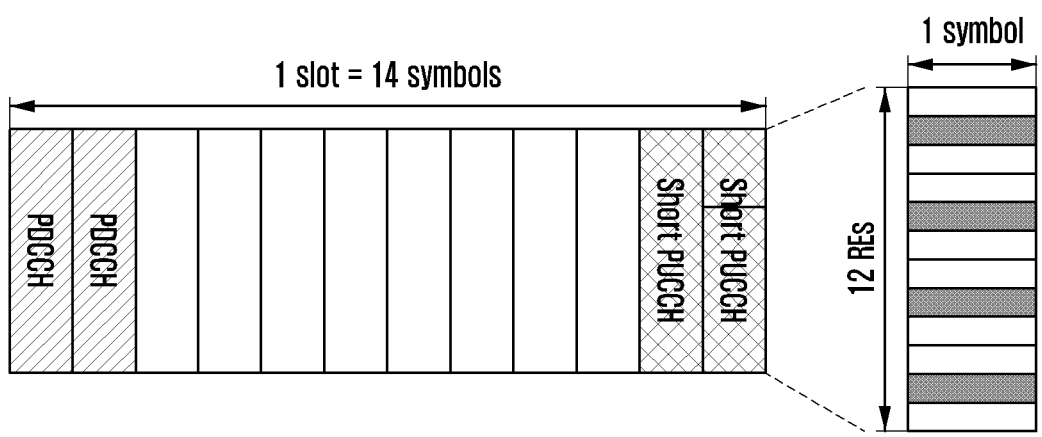
(b)

METHOD AND APPARATUS FOR REPORTING BEAM INFORMATION IN NEXT-GENERATION COMMUNICATION SYSTEM

TECHNICAL FIELD

The disclosure relates to 5G wireless communication (or next generation wireless communication). In particular, the disclosure relates to a procedure for performing beam measurement and reporting beam information in a wireless communication system.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System".

Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system.

In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology," have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Meanwhile, in LTE, various downlink (DL) reference signals (RSs) are designed for a terminal to measure and estimate a channel from a base station and uplink (UL) channels and UL control information (UCI) that are reported based on the DL RSs. The UL channels being reported in LTE include aperiodic channel state information (CSI) reporting on physical uplink share channel (PUSCH) (Aperiodic CSI Reporting using PUSCH) and periodic CSI reporting on physical uplink control channel (PUCCH) (Periodic CSI Reporting using PUCCH). The UCI includes a channel quality indicator (CQI), a precoding matrix indicator (PMI), a channel state information—reference signal (CSI-RS), and HARQ-ACK/NACK. 5G New Radio (NR) using above-6 GHz frequency bands, as a new radio access technology (RAT), employs beam measurement-based terminal and base station operations for which no detailed reporting scheme has been agreed yet.

DISCLOSURE OF INVENTION

Technical Problem

In NR, it has been agreed that a terminal performs measurement of beams of a base station in such a way of measuring a reference signal received power (L1-RSRP) based on a synchronization signal block (SSB) and a configurable CSI-RS, and it reports the L1-RSRP. It has also been agreed to use the following information and periodicities to report the L1-RSRP measured based on the SSB and CSI-RS.

For L1-RSRP and/or beam resource indicators (e.g. CRI or SSB index) reporting for beam management, support the following UL channels:
Short/long PUCC
PUSCH
Support the following reporting types for beam mgmt. on the above channel
For Periodic, support long PUCCH and short PUCC
Semi-persistent—support all channels
Aperiodic—support PUSCH and short PUCC That is, it has been basically agreed to use short and long PUCCHs and PUSCH for a beam measurement report. However, there has been no discussion about a method for a terminal to report a reception failure on some or all of the beams monitored for PDCCH for beam measurement and reporting. Although physical random access channel (PRACH) resources have been basically designed as part of a beam failure procedure, it has not been agreed how to quickly report a beam failure. There is therefore a need of a method for quickly reporting a partial or full beam failure using PUCCH resources.

The disclosed embodiments propose a method for a terminal to report, when it fails to receive some or all of the beams being monitored for PDCCH, the beam failure. The proposed method may be implemented in such a way of distinguishing between a partial beam failure, i.e., failing to receive some of the beams for PDCCH configured to a terminal, and a full beam failure, i.e., failing to receive all of the beams for PDCCH configured to the terminal, and dealing with each of the partial and full beam failures. In particular, the terminal transmits a beam failure message using periodic PUCCH resources.

The technical goals to be achieved through the disclosure are not limited to just solving the aforementioned problems, and other unmentioned technical problems will become apparent from the disclosed embodiments to those of ordinary skill in the art.

Solution to Problem

According to a disclosed embodiment, a beam information transmission method of a terminal includes receiving downlink control information from a base station on a downlink beam, generating, upon failure of decoding the downlink control information, beam information to report failure on the downlink beam, and transmitting the beam information to the base station on a uplink control channel.

According to a disclosed embodiment, a terminal for transmitting beam information may include a transceiver configured to transmit and receive signals and a controller configured to control to receive downlink control information from a base station on a downlink beam, generate, upon failure of decoding the downlink control information, the beam information to report failure on the downlink beam, and transmit the beam information to the base station on a uplink control channel.

According to a disclosed embodiment, a beam information reception method of a base station may include transmitting downlink control information to a terminal on a downlink beam, receiving beam information indicating failure on the downlink beam from the terminal on an uplink control channel, identifying the failure on the downlink beam based on the beam information received on the uplink control channel, and transmitting the downlink control information to the terminal on the reconfigured downlink beam.

According to a disclosed embodiment, a base station for receiving beam information may include a transceiver configured to transmit and receive signals and a controller configured to control to transmit downlink control information to a terminal on a downlink beam, receive beam information indicating failure on the downlink beam from the terminal on an uplink control channel, identify the failure on the downlink beam based on the beam information received on the uplink control channel, and transmit the downlink control information to the terminal on the reconfigured downlink beam.

Advantageous Effects of Invention

The method of a disclosed embodiment is advantageous in terms of reducing uplink resource overhead for transmitting beam information by identifying an exceptional situation for a terminal to receive beams using predetermined or periodically allocated resources with no necessity for a base station to allocate special resources to a terminal. The method of a disclosed embodiment is also advantageous in terms of reducing unnecessary power consumption, transmission, and signaling by allowing a terminal to use resources already allocated.

BRIEF DESCRIPTION OF DRAWINGS

FIG. 1 is a diagram illustrating parameters and numerologies in accordance with various PUCCH formats under discussion in a communication system.

FIGS. 2A and 2B are diagrams illustrating resource configurations of a PUCCH format for use in a communication system

MODE FOR THE INVENTION

Figure 2B:
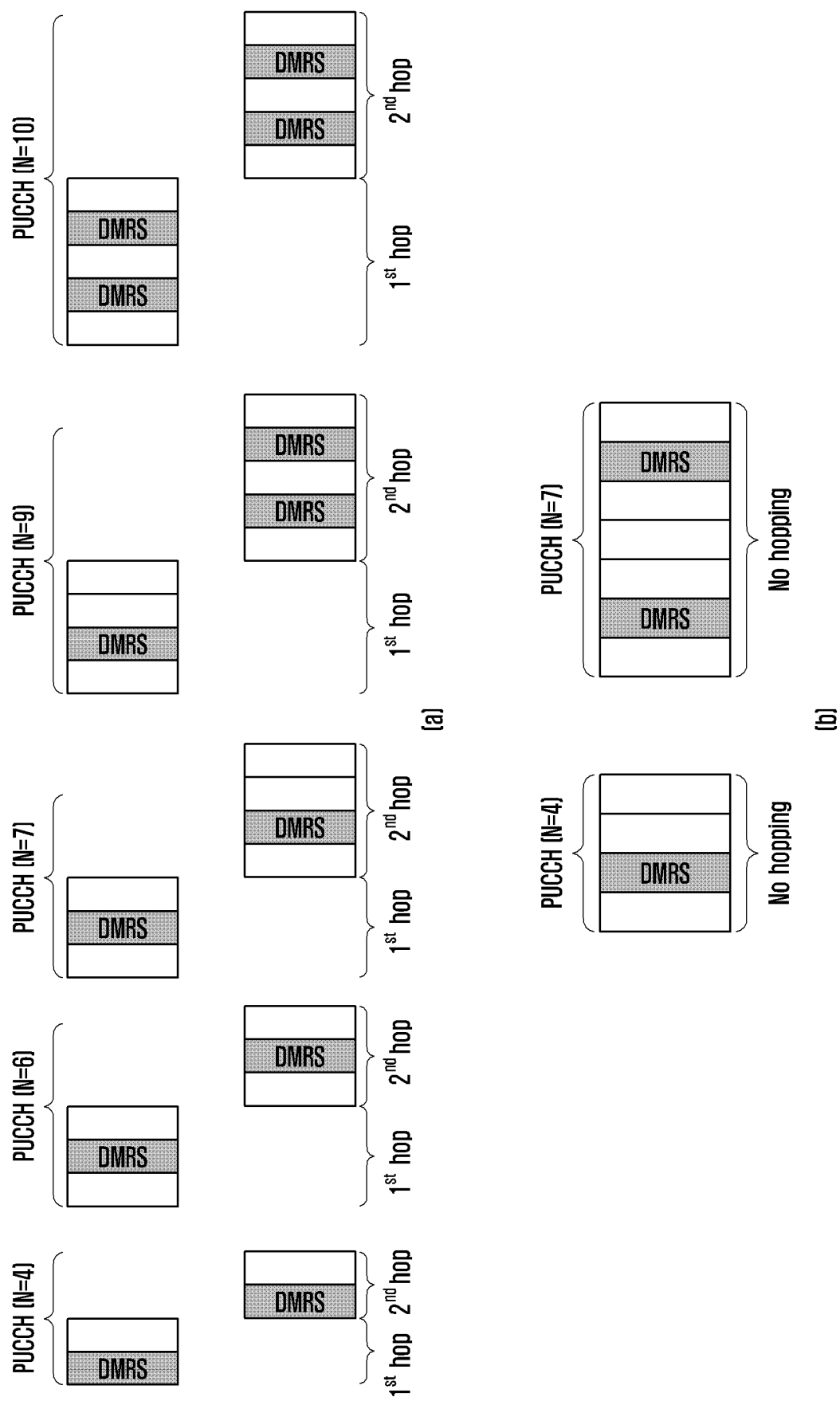

Exemplary embodiments of the disclosure are described in detail with reference to the accompanying drawings. The same reference numbers are used throughout the drawings to refer to the same or like parts. Detailed descriptions of well-known functions and structures incorporated herein may be omitted to avoid obscuring the subject matter of the disclosure.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

It may be advantageous to start the detailed descriptions of the disclosed embodiments by setting forth the basic beam measurement and reporting procedure. The beam measurement and reporting procedure may be performed on the basis of two kinds of signals as follows.

The first is an SS reference signal received power (SS-RSRP). The SS-RSRP is defined as the linear average over the power contributions of the resource elements (REs) that carry secondary synchronization signals and measured within a confined window duration of synchronization signal/physical broadcast channel (SS/PBCH) block measurement time configuration (SMTC).

For SS-RSRP determination, a demodulation reference signal (DMRS) for PBCH or a configured CSI-RS may also be used in addition to the SS. In this case, the RSRP measurement based on such signals may be performed by linear averaging over the power contributions of the REs that carry the DMRS for PBCH or CSI-RS. The RSRP measurement based on such signals may be performed in association with at least one of RRC states of the terminal, the RRC states including RRC_IDLE intra-frequency, RRC_IDLE inter-frequency, RRC_INACTIVE intra-frequency, RRC_INACTIVE inter-frequency, RRC_CONNECTED intra-frequency, and RRC_CONNECTED inter-frequency.

The second is a CSI reference signal received power (CSI-RSRP). The CSI-RSRP is defined as the linear average over the power contributions of the REs that carry CSI-RS signals in a frequency band preconfigured to the terminal a CSI-RS occasions. The CSI-RS is transmitted on a specific antenna port of the base station, and the measured CSI-RSRP may vary according to whether or not a reception diversity is applied in a one-port scenario and a two-port scenario. The CSI-RS for beam measurement of the terminal may be configured with one port or two or more ports. In this case, the RSRP measurement may be performed in association with at least one of RRC states of the terminal, e.g., RRC_CONNECTED intra-frequency and RRC_CONNECTED inter-frequency.

The terminal may report a beam measurement result using both the PUCCH and PUSCH among uplink resources. To this end, various methods can be considered in accordance with the uplink frequency/time resources and reporting periodicity that the base station allocates to the terminal.

In NR, the PUCCH resources for measuring and reporting a beam state are designed as follows. Description are made hereinafter of the PUCCH formats (PF) being configured in radio resource control (RRC).

[PUCCH-resource-config-PF0] providing a set of resources for PUCCH transmission with PUCCH format 0;
[PUCCH-resource-config-PF1] providing a set of resources for PUCCH transmission with PUCCH format 1;
[PUCCH-resource-config-PF2] providing a set of resources for PUCCH transmission with PUCCH format 2;
[PUCCH-resource-config-PF3] providing a set of resources for PUCCH transmission with PUCCH format 3;
[PUCCH-resource-config-PF4] providing a set of resources for PUCCH transmission with PUCCH format 4.

As listed above, 5 PUCCH formats from PUCCH format 0 to PUCCH format 4 are considered in NR. A PUCCH may be classified into one of a short PUCCH and a long PUCCH in accordance with the amount of PUCCH resources (i.e., number of symbols) configured by the base station in a slot or transmission time interval (TTI), the PUCCH format being determined in accordance with the size of the UCI to be transmitted in uplink, i.e., 1-2 bits or 3 or more bits.

FIG. 1 is a diagram showing a table of PUCCH formats defined with different parameters and numerologies that are under discussion in NR; for example, PUCCH format 4 may be distinguished from other formats by an orthogonal cover code (OCC) and a cyclic shift operation in a scenario of multiplexing terminals. Meanwhile, it may be assumed that PUSCH carries no separate UCI.

Each of the PUCCH formats has a UCI size that may change. Table 1 shows a UCI size and a number of DMRS symbols that are calculated under the assumption of a number of OFDM symbols in one resource block (RB), and the UCI size may vary in accordance with the number of RBs carrying the PUCCH configured for the terminal. Table 1 shows exemplary values in the case of a long PUCCH of 3 bits or more and a modulation order of QPSK. In Table 1, the UCI size of the PUCCH is a size taken after the information being carried by the UCI is encoded in accordance with each information bit size.

TABLE 1

| OFDM symbols | UCI size with hopping for 1 RB (number of DMRSs) | UCI size without hopping for 1 RB |
| --- | --- | --- |
| 4 OS | 48(2) | 72(2) |
| 5 OS | 72(2) | 72(2) |

TABLE 1-continued

| OFDM symbols | UCI size with hopping for 1 RB (number of DMRSs) | UCI size without hopping for 1 RB |
| --- | --- | --- |
| 6 OS | 96(2) | 96(2) |
| 7 OS | 120(2) | 120(2) |
| 8 OS | 96(4), 144(2) | 144(2) |
| 9 OS | 120(4), 144(2) | 144(2) |
| 10 OS | 144(4), 192(2) | 144(4), 192(2) |
| 11 OS | 168(4) | 168(4), 206(2) |
| 12 OS | 192(4) | 192(4), 240(2) |
| 13 OS | 216(4) | 216(4), 264(2) |
| 14 OS | 240(4) | 240(4), 288(2) |

Accordingly, the UCI size may be changed according to the PUCCH format, whether the PUCCH is a short or long PUCCH, and the coding rate and modulation scheme.

The UCI may include different information according to the type of the PUCCH format; for example, the UCI may include at least one of a scheduling request (SR), HARQ ACK/NACK, and CSI (CQI, RI, and PMI). Here, the UCI may further include information indicating a result of the beam measurement performed by the terminal, the information including a beam resource indicator and L1-RSRP as a result of the beam measurement performed by the terminal. Here, the beam resource indicator may be an SSB index (e.g., information included in PBCH) for the case of performing the beam measurement based on SSB and a CSI-RS resource indicator (CRI) as an index indicating a CSI-RS for the case of performing the beam measurement based on a CSI-RS. The SSB index and the CSI-RS index may be carried in a common field or separate fields.

According to an alternative embodiment, the SSB index may be omitted in the case where the SSB being monitored by the terminal is one of the resources of a serving base station.

Here, the beam resource indicator being transmitted by the terminal may vary in accordance with the number of the beams configured for the terminal. That is, the base station may configure up to 64 beams for the terminal and, in this case, the beams can be distinguished by a number of bits being calculated with $\log_2[L]$ (L is the number of bits). That is, the beam resource indicator may have a length of up to 6 bits.

The L1-RSRP has a length of 7 bits for indexing different ranges of measurement result values. For example, the L1-RSRP may be reported with one of the indices listed in Table 2; although Table 2 shows specific ranges of measurement result values and indices indicating the respective ranges, it is obvious that the ranges and the corresponding indices may be changed.

TABLE 2

| index | measured quantity value (L1-RSRP, dBm) |
| --- | --- |
| 0 | L1-RSRP < −140 |
| 1 | −140 <= L1-RSRP < −139 |
| 2 | −139 <= L1-RSRP < −138 |
| 3 | −138 <= L1-RSRP < −137 |
| ... | ... |
| 97 | −44 <= L1-RSRP |

Meanwhile, in the case where multiple beams are configured for a terminal, the terminal may report a maximum beam measurement value with one of the indices listed in Table 2, and a measurement value difference between the beam with the maximum beam measurement value and another beam with 4 bits. The bit-size (or bitwidth) of the L1-RSRP being reported by the terminal may be defined by 7+4k (k denotes a number of beams for reporting, k=0, 1, 2, ...). For example, in the case where the number of beams is 4 (i.e., 2 bits), the number of bits required for reporting the beam measurement result may be calculated as follows.

| | |
| --- | --- |
| $2*1+7+4*1=13$ bits | 1-beam report: |
| $2*2+7+4*(2-1)=23$ bits | 2-beam report: |
| $2*3+7+4*(3-1)=33$ bits | 3-beam report: |
| $2*4+7+4*(4-1)=105$ bits | 4-beam report: |
| $6*64+7+4*(64-1)=24885$ bits | 6-beam report: |

Meanwhile, the L1-RSRP may be reported to the base station along with a beam index (BI or CRI) via separate resources. The resources for reporting the L1-RSRP may be identified by the resources for the beam index and at least one of time, frequency, and code domain resources.

FIGS. 2A and 2B are diagrams illustrating resource configurations of a PUCCH format for use in a communication system. The various PUCCH formats under discussion for use in the next generation communication differ in radio resource configuration and DMRS location.

For example, PUCCH format 0 has no DMRS, and PUCCH formats 1 to 4 are distinguished from each other by the location and ratio of DMRSs. In a specific PUCCH format, the number of DMRSs varies according to whether frequency hopping is applied.

FIG. 2A shows exemplary implementations of PUCCH formats 1 and 2. Part (a) of FIG. 2A shows an exemplary implementation of PUCCH format 1 in which the shaded areas represent symbols to which the DMRS is mapped. Part (b) of FIG. 2A shows an exemplary implementation of PUCCH format 2 in which the DMRS is mapped to the first, fourth, seventh, and tenth symbols. The remaining radio resources may be used for transmitting UCI of PUCCH.

FIG. 2B shows exemplary implementations of PUCCH formats 3 and 4 in which frequency hopping may be applied. Part (a) of FIG. 2B shows a PUCCH resource configuration with DMRS locations in the case where frequency hopping is applied; in the drawing, N may denote a number of symbols for PUCCH. Part (b) of FIG. 2B shows a PUCCH resource configuration with DMRS locations in the case where frequency hopping is not applied. In the case where frequency hopping is applied as shown in part (a) of FIG. 2B, one more DMRS symbol may be transmitted per hop on the PUCCH resources; in the case where frequency hopping is not applied as shown in part (b) of FIG. 2B, one or more DMRS symbols may be transmitted on the PUCCH resources. The remaining radio resources may be used for transmitting UCI of PUCCH.

Although the descriptions made with reference to FIGS. 2A and 2B are directed to specific radio resource configurations, it is obvious that the radio resource configurations may be changed in design and format in accordance with the improvement and implementation of the communication system. It is also obvious that, if a new PUCCH format is proposed, the number and locations of the DMRSs can be changed.

Although the following embodiment is directed to the case where both the BI (or CRI) and L1-RSRP are transmitted to the base station, the disclosure is not limited to the embodiment. In NR, a CQI size may be determined differently in various scenarios, and the CQI may be designed in a form similar to that in use for LTE.

Figure 3:
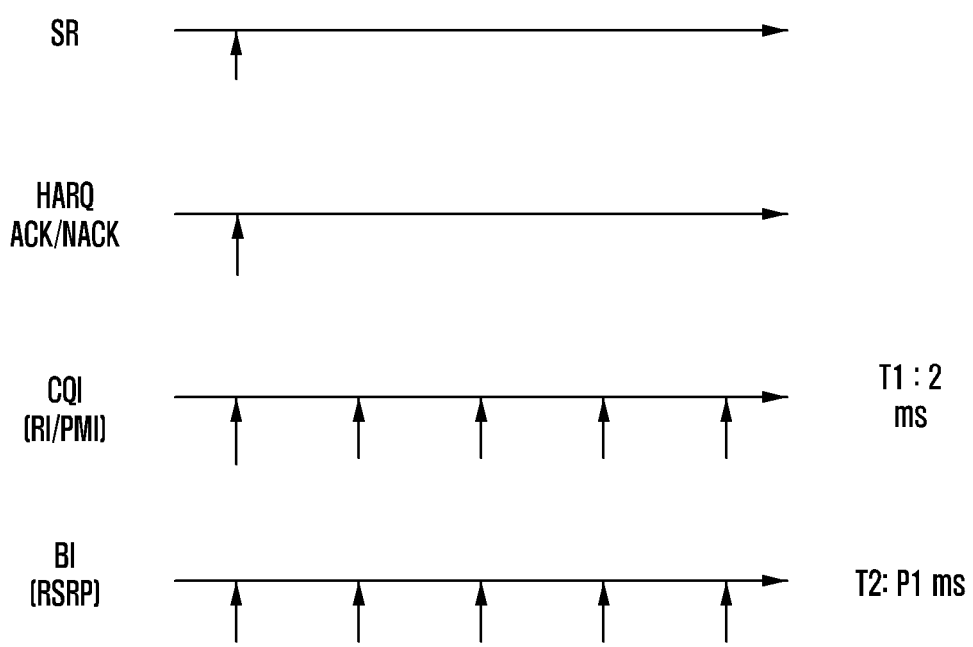
FIG. 3 is a diagram illustrating an exemplary UCI reporting scenario of a terminal.
Figure 4:
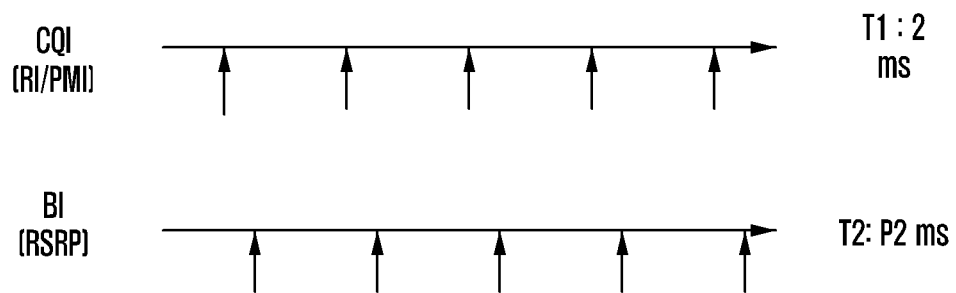
FIG. 4 is a diagram illustrating another exemplary UCI reporting scenario of a terminal.

Hereinbelow, descriptions are made of the beam measurement result reporting periodicity and timing of a terminal. The beam measurement result reporting periodicity and timing of the terminal may determine an encoding scheme. FIGS. 3 and 4 are diagrams illustrating exemplary UCI reporting scenarios of a terminal, the terminal having achieved synchronization in the scenario of FIG. 3 and having achieved no synchronization in the scenario of FIG. 4.

In the case where the CQI and BI are reported at an interval of 2 ms as shown in FIG. 3, the terminal may transmit an SR to the base station along with the CQI and BI. Here, the SR may have a length equal to or less than 2 bits and may be encoded independently of the CQI and BI. In FIG. 3, assuming subcarrier spacing of 15 kHz, the terminal may transmit the UCI using the OFDM symbols allocated for PUCCH, e.g., at an interval of 1, 2, 5, 10, 20, 32, 40, 64, 80, 128, 160, 320, or 640 ms.

In the embodiment of FIG. 3, the terminal may report the BI and the beam measurement result (RSRP) along with the CQI at a synchronized timing. In this case, the terminal may transmit the BI at all or some of CQI transmission occasions. That is, assuming that the CQI reporting periodicity is 2 ms, the BI reporting periodicity may be a multiple of 2 ms. In the embodiment of FIG. 4, the terminal may report the MI and the beam measurement result at a timing different from the CQI reporting timing and, in this case, the BI reporting periodicity of the terminal may be 2 ms or longer.

Hereinafter, descriptions are made of the BI reporting procedures proposed in exemplary embodiments with reference to FIGS. 5 to 10. The descriptions are directed to the operations of a base station and a terminal in the case where the terminal fails to receive some of multiple beams in a beam measurement procedure. In the following descriptions, if it is said that a beam fails, this may mean that a terminal fails to decode PDCCH on a specific beam. If it is said that a terminal identifies failure of some beams, this may mean that the terminal detects failure of some of DL beams or UL beams configured for the terminal or failure of one of multiple DL-UL beam pair links (BPLs).

In a proposed embodiment, in order to notify the base station of a beam failure in the BI reporting procedure, the terminal may transmit to the base station UCI including a value or information indicating at least one of following information items. In a proposed embodiment, the beam failure notification procedure may be designed such that there is no necessity to define a new PUCCH format.

information being transmitted for reporting beam failure
1-a) presence/absence of beam failed to receive
1-b) index of beam failed to receive
1-c) group index of beams failed to receive
2-a) presence/absence of new candidate beam(s)
2-b) index(es) of new candidate beam(s)
2-c) index(es) and beam quality(s) (e.g., L1-RSRP) of new candidate(s)
2-d) new candidate group index (a set of candidate beams)

Hereinbelow, a description is made of the transmission resources for beam failure reporting and a method for utilizing the transmission resources. A single-beam scenario is described first with reference to FIGS. 5 and 6, and then a multi-beam scenario is described with reference to FIGS. 7 and 8.

Figure 5:
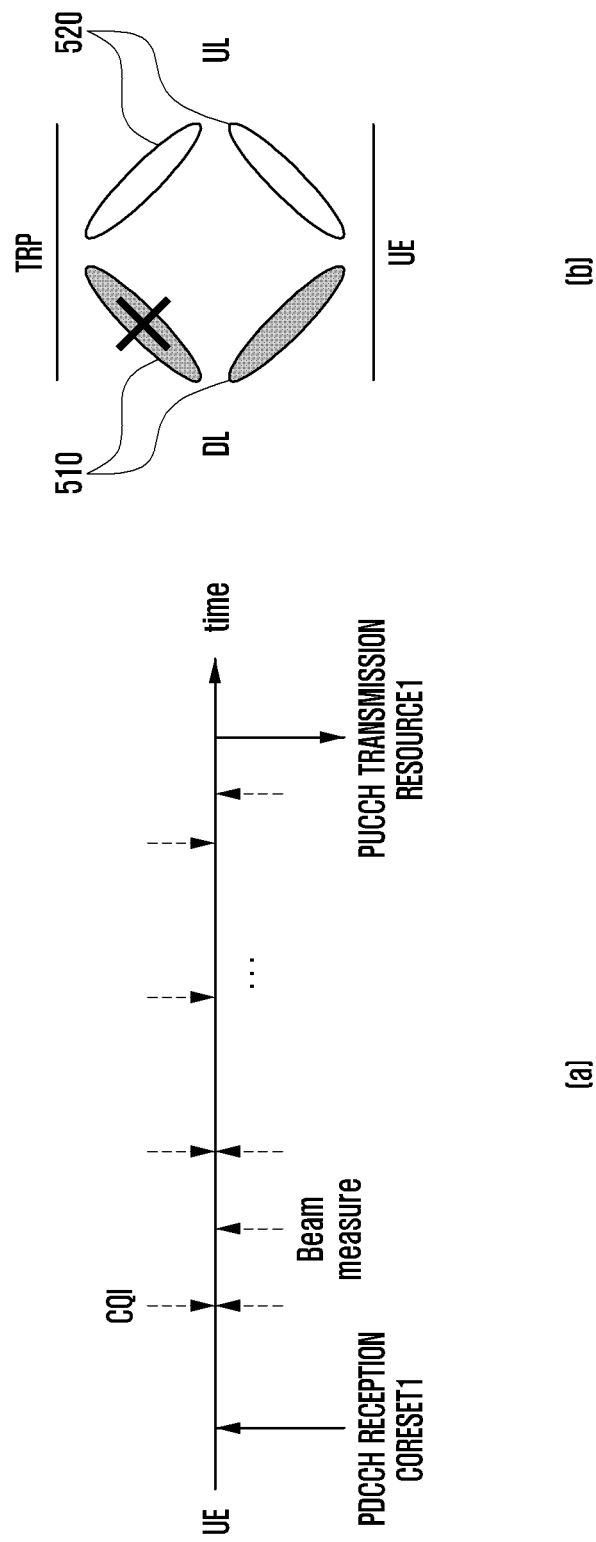
FIG. 5 is a diagram for explaining a beam failure reporting procedure of a terminal according to an embodiment.

In the single beam scenario, DL beams 510 and UL beams 520 may be configured between a terminal (user equipment (UE)) and a base station (transmission and reception point (TRP) or gNB) as shown in part (b) of FIG. 5. The DL and UL beams 510 and 520 may form a beam pair link (BPL).

The terminal may receive a control resource set (CORESET) via a DL beam, and corresponding PUCCH resource may be allocated in association with the CORESET. For such PUCCH resource, it may be necessary to configure a plurality of PUCCH formats.

In part (a) of FIG. 5, the terminal receives a PDCCH in CORESET1 and performs CQI measurement and beam measurement based on the received DL beam. Next, the terminal transmits PUCCH carrying information on the receive beam. Here, the terminal may simultaneously transmit the CSI (CQI/RI/PMI) and BI or the SR and BI using the PUCCH resources. These two cases are separately described.

A description is made of the simultaneous transmission of the CSI and BI. Here, the terminal may transmit the beam related information to the base station in an implicit manner or an explicit manner. In the procedure for the terminal to transmit the beam related information to the base station in the implicit manner, if CSI and BI are reported at respective periodicities that are synchronized, the CSI (CQI/RI/PMI) and BI are encoded together to be transmitted to the base station. That is, at least one UCI of the CSI may be encoded together with the BI, but of course, the UCI may be encoded separately from the BI.

In an implicit method, assuming that a configuration is made to sweep 16 beams and report two maximum values (best beam and second best beam), the terminal may transmit a wideband CQI (4*4 bits) and a BI (2*4+7 (measurement value)+4 (difference value) bits because of 16 beams being configured for the terminal) to the base station. That is, in the case of measuring 16 beams based on the SSB or CSI-RS and reporting 2 maximum values, the two beams having the maximum values may be changed such that the beam indices and the corresponding values to be reported by the terminal are changed, by way of example, from (beam index #1, measurement value)/(beam index #2, measurement) to (beam index #2, measurement value)/(beam index #3, measurement). This is the case where the beam RSRP being measured on the beam identified by beam index #1 decreases such that the terminal performs measurement on the beam identified by beam index #3 and reports the measurement result.

Here, the 16 beams may be partly or entirely included in a candidate beam pool, and the base station may preserve and manage the beam indices reported by the terminal in the candidate beam pool. If the terminal reports about the beam identified by beam index #3, the base station sets the transmit beam to the beam identified by beam index #3 to transmit downlink signals to the terminal in the next scheduling cycle. This method may be called an implicit method in that the base station notices the beam failure on the beam identified by beam index #1 without any explicit indication from the terminal, and this method allows the beam to be changed without modification of the existing beam reporting procedure.

An explicit method is hereinafter described in detail. In the explicit method, the terminal may explicitly notify the base station of a beam failure in the beam related information reporting procedure. According to one of various embodiments, dropping of CQI may be considered. For example, the UE uses the CSI report field including 16 bits in PUCCH to report the wideband CQI. The UE may use a BI field including 19 bits to transmit beam index and beam measurement values and difference values. At this time, the UE may drop (i.e, not transmit) the CQI to notify the beam reception failure. The terminal may fill the corresponding field with the information indicating the beam on which the beam failure occurred instead of the CQI (i.e., skipping CQI transmission). In this embodiment, the beam failure report may include at least one the aforementioned information items 1-a, 1-b, and 1-c.

The terminal may also transmit the index (4 bits) of the beam on which it failed to decode a PDCCH (i.e., beam failure occurred) to the base station. In this case, the terminal may pad the space, remaining after filling the BI in the field, with zeros because the CSI and BI should be distinguished from each other within 16 bits for the existing CSI report. Upon receipt of the beam related information from the terminal, the base station may identify the occurrence of the PDCCH decoding failure based on detection of the zero-padded field and determine to select a new beam. In this embodiment, the beam failure report may include at least one of the aforementioned information items 1-b and 1-c.

According to an alternative embodiment, the terminal may use the 16-bit CSI report field to report a wideband CQI and the 19-bit BI report field to transmit a beam index, a beam measurement value (maximum value), and a difference value (delta value). In this case, the terminal may drop the CQI to transmit new candidate beam related information to the base station. That is, the terminal may fill the corresponding field with the new candidate beam related information (e.g., BI or CRI) instead of the CQI, and the base station assumes that the terminal monitors the new candidate beam for PDCCH. Meanwhile, the term "candidate beam" denotes a beam excluding the beams configured for the terminal to monitor and, in the case where a single beam is configured for the terminal, a beam different from the corresponding beam.

According to an alternative embodiment, the terminal may extend the CSI field (i.e., assign additional bits) to allocate additional resources or regard the RI/CQI field as a field for BI to transmit the BI.

Figure 6:
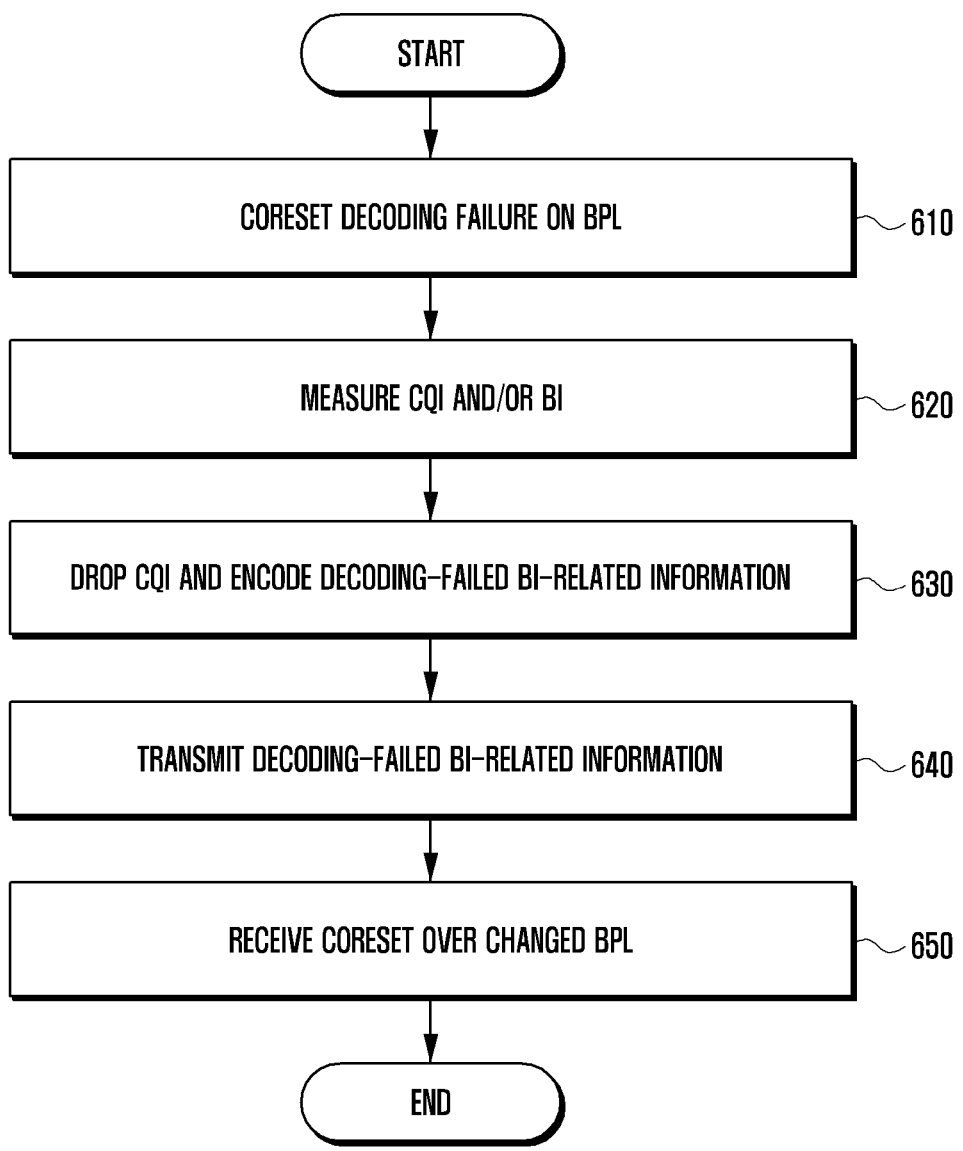
FIG. 6 is a flowchart illustrating a beam failure reporting procedure of a terminal according to an embodiment.

The above embodiments are described with reference to FIG. 6 in which the terminal detects decoding failure in a CORESET on a specific BPL and identifies occurrence of a beam failure at operation 610. Next, the terminal performs measurement at operation 620 to generate a CQI and/or a BI to be transmitted to the base station and encodes, at operation 630, BI information associated with the beam on which the beam failure occurred. In this operation, at least one of the above-described methods may be applied; for example, the terminal may drop the CQI and transmit a beam index and/or a beam measurement value to the base station instead of the CQI. It may also be possible for the base station to drop the CQI and transmit candidate beam related information to the base station instead of the CQI, padding the space remaining after filling the information on the beam on which the beam failure occurred with zeros in the UCI. The CQI drop of the terminal may be encoded into a predetermined value in the corresponding field in an implementation manner. For example, the field may be padded with zeros or predetermined values (e.g., 111111).

Subsequently, the UE reports the beam-related information that has failed decoding to the base station by including it in the UCI (640), and receives the CORESET using the BPL changed by the base station (650). The base station selects a new beam based on the information reported by the terminal on the failed beam and retransmits the CORESET. According to the above-described embodiment, when the UE fails to decode downlink control information through a specific DL beam, the UE may report the failure of the DL beam to the base station through the UL beam connected to the DL beam.

Hereinafter, a description is made of the method for transmitting the SR and BI on PUCCH resources according to an embodiment. According to an embodiment, the terminal may multiplex information on whether PDCCH decoding failed into SR resources of the PUCCH resources to transmit the information to the base station. In the case of transmitting the SR to the base station in an on-off key (OOK) mode, the terminal may use 1-bit information set to 1 or 0 to notify the base station whether or not a beam failure occurred. In this embodiment, the beam failure report may include the aforementioned information item 1-a.

According to an alternative embodiment, the ACK/NACK and the SR may be cyclically shifted by 180 degrees and 90 degrees respectively so as to be identified separately on the PUCCH resources. Meanwhile, the BI information may be shifted by 450 degrees to be identified. Although specific values are set forth by way of example in this embodiment, the cyclic shift angle is not limited thereto. For example, the cyclic shift angle may be set to various values such as 60 degrees and 72 degrees.

Hereinbelow, a description is made of the multi-beam scenario with reference to FIGS. 7 and 8.

In the multi-beam scenario, multiple BPLs may be configured between a terminal (UE) and a base station (TRP or gNB). Part (b) of FIG. 7 shows multiple BPLs 710 and 720 each configured by pairing a DL beam and a UL beam based on the beam correspondence or beam reciprocity, and part (c) of FIG. 7 shows the case of a plurality of BPLs 730-740 and 750-760 in which the DL beam and the UL beam are separated because there is no beam reciprocity or beam relevance.

The terminal receives multiple CORESETs on the multiple configured beams, and multiple corresponding PUCCH resources may be allocated in association with the multiple configured CORESETs. For each of the PUCCH resources, it may be necessary to configure a plurality of PUCCH formats.

Figure 7:
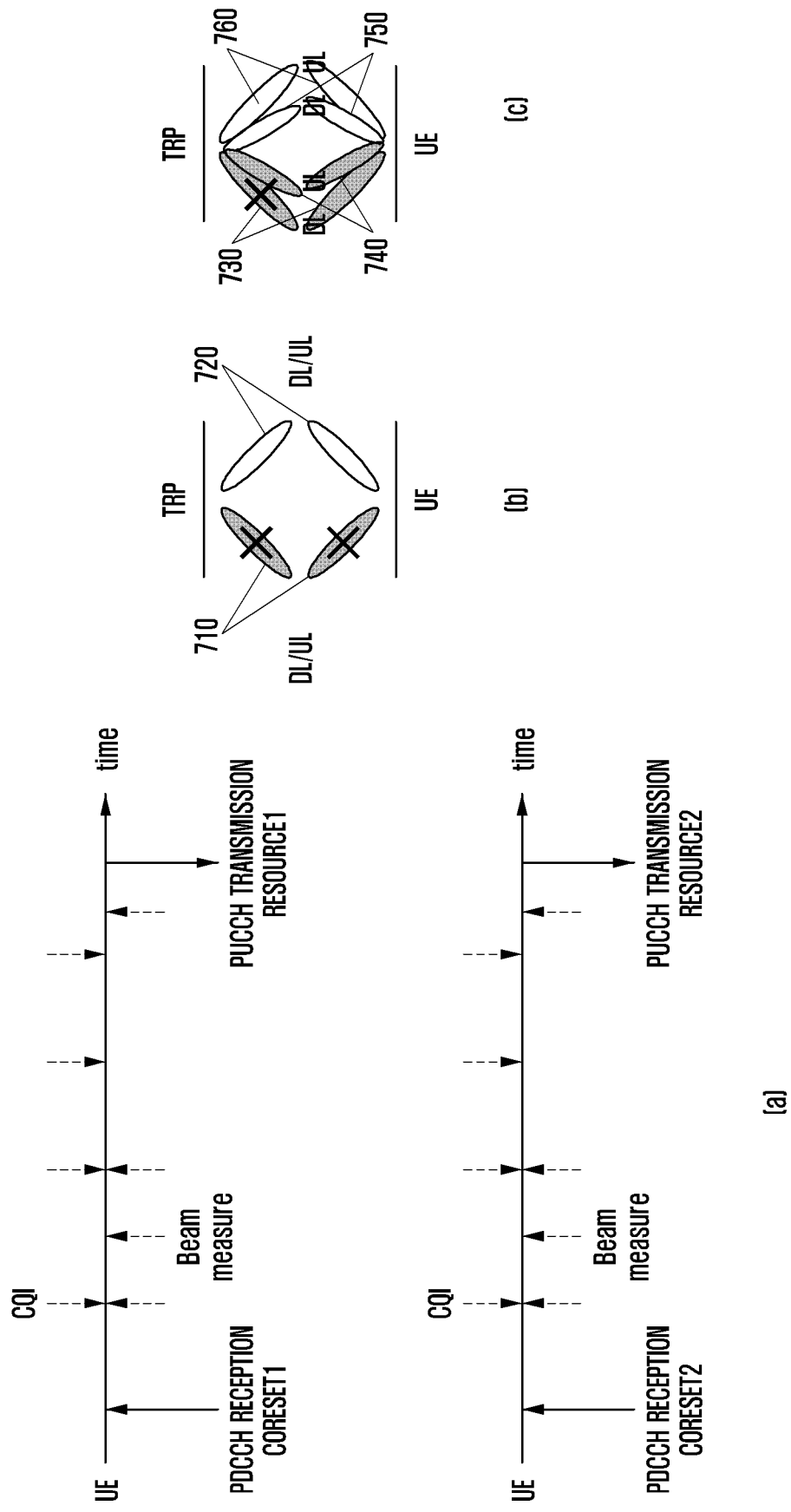
FIG. 7 is a diagram for explaining a beam failure reporting procedure of a terminal according to another embodiment.

In part (a) of FIG. 7, the terminal receives a PDCCH in CORESET1 and performs CQI measurement and beam measurement based on the received DL beam. Next, the terminal transmits information on the received beam to the base station on first PUCCH transmission resources. Similarly, the terminal receives a PDCCH in CORESET2 at the same or a different timing or on a different beam and performs CQI measurement and beam measurement based on the received DL beam. The terminal may transmit the information on the received beam on second PUCCH transmission resources. The terminal may simultaneously transmit the CSI (CQI/RI/PMI) and BI using the PUCCH resources and, in this case, it may be necessary to change the beam through one of an implicit beam changing operation and an explicit beam changing operation, which are separately described in similar manners as described with reference to FIGS. 5 and 7.

In an implicit method, a PUCCH corresponds to a CORESET on each of the multiple beams. The terminal transmits the CSI (CQI/RI/PMI) and BI to the base station on the PUCCH resources; the CSI and BI may be encoded together. That is, at least one of the CSIs of UCI may be encoded with BI and reported to the base station. Of course, CSI and BI may be separately encoded and reported to the base station.

In an implicit method, assuming that a configuration is made to sweep 16 beams (8 for transmitting CORESET A and 8 for transmitting CORESET B) and report 4 maximum values (best beam, second best beam, third best beam, and fourth best beam) per two PUCCH resources allocated in each CORESET, the terminal may transmit a wideband CQI (4*4 bits) and a BI (4*4+7 (measurement values)+4 (difference values) bits) because of 16 beams being configured for the terminal) to the base station. That is, in the case of measuring 16 beams based on the SSB or CSI-RS and reporting 4 maximum values, the four beams having the maximum values may be changed such that the beam indices and the corresponding values to be reported by the terminal are changed, by way of example, from (beam index #1, measurement value)/(beam index #2, measurement)/(beam index #3, measurement value)/(beam index #4, measurement value) to (beam index #2, measurement value)/(beam index #3, measurement value)/(beam index #7, measurement value)/(beam index #8, measurement value). This is the case where the beam RSRPs being measured on the beams identified respectively by beam index #1 and beam index #4 decrease such that the terminal performs measurement on the beams identified respectively by beam index #7 and beam index #8 and reports the measurement result.

Here, the 16 beams may be partly or entirely included in a candidate beam pool, and the base station may preserve and manage the beam indices reported by the terminal in the candidate beam pool. If the terminal reports about the beam identified by beam index #3, the base station sets the transmit beams to the beams identified respectively by beam index #7 and beam index #8 to transmit downlink signals to the terminal in the next scheduling cycle. This method may be called an implicit method in that the base station notices the beam failure on the beams identified respectively by beam index #1 and beam index #4 without any explicit indication from the terminal and it allows the beam to be changed without modification of the existing beam reporting procedure.

An explicit method is hereinafter described in detail. The explicit method may be implemented in several embodiments as described above. First, a 16-bit CSI report field configured per beam for CORESET A and CORESET B may be used for reporting a wideband CQI and a 39-bit BI field may be used for transmitting a beam index, a beam measurement value, and a difference value (delta). Here, the terminal may drop the CQI of the PUCCH resources corresponding to CORESET A to notify the base station of a reception beam failure for CORESET A. Likewise, the terminal may drop the CQI of the PUCCH resources corresponding to CORESET B to notify the base station of a reception beam failure for CORESET B. The terminal may fill the corresponding field with the information indicating the beam on which the beam failure occurred instead of the CQI. In this embodiment, the beam failure report may include at least one the aforementioned information items 1-a, 1-b, and 1-c. The CQI drop of the terminal may be encoded into a predetermined value in the corresponding field in an implementation manner. For example, the field may be padded with zeros or predetermined values (e.g., 111111).

Next, the terminal may explicitly transmit to the base station an index (4 bits) of the beam corresponding to CORESET A in which PDCCH decoding failed. In this embodiment, since the CSI information and the BI must be distinguished within 16 bits for the existing CSI reporting, the terminal may transmit the fields excluding the BI by zero padding. Upon receiving the beam-related information transmitted by the terminal, the base station can determine that a PDCCH decoding failure has occurred by checking the zero padded field, and can determine a new beam change. In the case of the present embodiment, at least one of 1-b and 1-c may be included as information transmitted when reporting the beam failure described above.

According to an alternative embodiment, the terminal may use the 16-bit CSI report field of the beam for each CORESET to report a wideband CQI and the 39-bit BI report field to transmit a beam index, a beam measurement value, and a difference value. In this case, the terminal may drop the CQI to transmit new candidate beam related information to the base station. That is, the terminal may fill the corresponding field with the new candidate beam related information (e.g., BI or CRI) instead of the CQI, and the base station assumes that the terminal monitors the new candidate beam for PDCCH. Meanwhile, the term "candidate beam" denotes a beam excluding the beams configured for the terminal to monitor and, in the case where multiple beams are preconfigured for the terminal, a specific beam among the preconfigured beams. The candidate beam may also be a new beam that has not been monitored rather than the beams preconfigured for the terminal. In this embodiment, the beam failure report may include at least one the aforementioned information items 2-b and 2-c.

According to another embodiment, the UE may explicitly transmit an index (4 bits) of a beam corresponding to A CORESET that has failed PDCCH decoding. In this embodiment, since the CSI information and the BI must be distinguished within 16 bits for the existing CSI reporting, the terminal may transmit the fields excluding the BI by zero padding. Meanwhile, unlike the above-described embodiment, the UE may transmit the index of the beam corresponding to A CORESET to the CQI field of the beam corresponding to B CORESET. That is, a field excluding BI among UCIs of B CORESET is zero padding and may be transmitted to a base station including a beam index corresponding to A CORESET. In the case of the present embodiment, at least one of 1-b and 1-c may be included as information transmitted when reporting the beam failure described above.

According to an alternative embodiment, the terminal may use the 16-bit CSI report field of the beam for each of CORESET A and CORESET B to report a wideband CQI and the 39-bit BI report field to transmit a beam index, a beam measurement value, and a difference value. In this case, piggybacking the information notifying the base station of the reception beam failure in CORESET A on PUSCH resources may be considered. That is, the beam related information may be transmitted on the PUSCH resources.

The above embodiments are described with reference to FIG. 8 in which a terminal measures L1-RSRP on multiple preconfigured beams at operation 810. If it is determined at operation 820 that PDCCH decoding succeeded on all of the configured beams, the terminal transmits, at operation 825, measured beam related information to a base station through a previously scheduled PUCCH. If it is determined at operation 820 that PDCCH decoding failed in a CORESET on a specific beam and if it is determined at operation 830 that the PDCCH decoding failed on all beams, the terminal declares beam failure at operation 840. If it is determined at operation 830 that PDCCH decoding failed only on some beams, the terminal may generate beam related information according to one of the above-described embodiments or a combination of at least two of the above-described embodiments and transmit, at operation 850, the beam related information (information on the beam on which beam failure occurred, e.g., at least one beam index, beam measurement value, and difference value) to the base station through the existing PUCCH.

Figure 8:
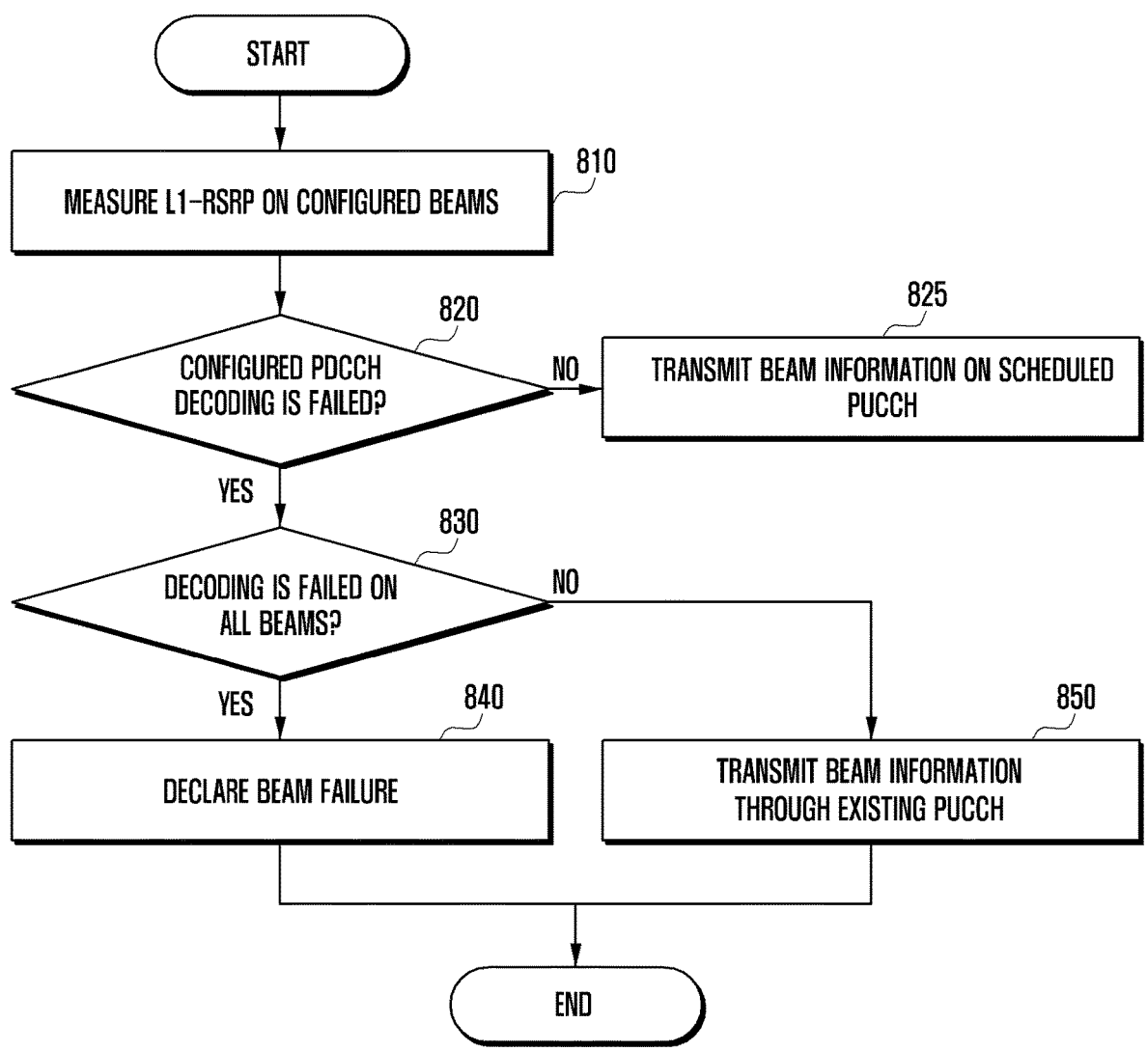
FIG. 8 is a flowchart illustrating a beam failure reporting procedure of a terminal according to another embodiment.

Although not explicitly shown in FIG. 8, the terminal may receive the CORESET using a BPL changed by the base station based on the report from the terminal. That is, the base station may select a new beam based on the information on the beam on which beam failure occurred among multiple beams configured for the terminal and retransmit the CORE-SET. The above-described procedure may be understood as a procedure for the terminal to notify the base station of the failure on a first beam among the multiple preconfigured beams or a first BPL through a second beam or a second BPL.

The operations of the terminal and the base station described in the embodiments described with reference to FIG. 3 may be performed in association with the radio resource configurations according to the PUCCH formats described with reference to FIGS. 2A and 2B. That is, the terminal may transmit information on the beam measurement result or beam failure to the base station using one of the PUCCH formats described with reference to FIGS. 2A and 2B, which show the radio resource configurations and locations and number of symbols to which a DMRS is mapped as described above.

Figure 9:
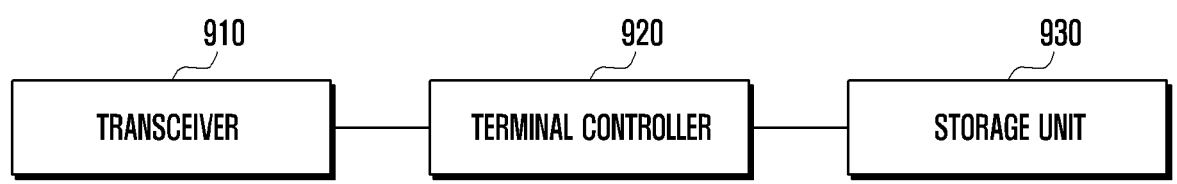
FIG. 9 is a block diagram illustrating a configuration of a terminal according to a disclosed embodiment.

FIG. 9 is a block diagram illustrating a configuration of a terminal according to a disclosed embodiment. In reference to FIG. 9, the terminal may include a transceiver 910, a terminal controller 920, and a storage unit 930. In the disclosure, the terminal controller 920 may be defined as a circuit, an application-specific integrated circuit, or at least one processor.

The transceiver may communicate signals with a network entity. For example, the transceiver 910 may receive downlink signals for use in beam measurement from a base station and transmit beam failure-related information to the base station.

The terminal controller 920 may control overall operations of the terminal as described in the above-disclosed embodiments. For example, the terminal controller 920 may control the transceiver 910 and the storage unit 930 to perform the operations as described in the above-disclosed embodiments with reference to the drawings. In detail, the terminal controller 920 may detect beam failure for a beam from the base station and generate and transmit information related to the corresponding beam to the base station.

The storage unit 930 may store at least one of information transmitted/received by the transceiver 910 and information generated by the terminal controller 920.

Figure 10:
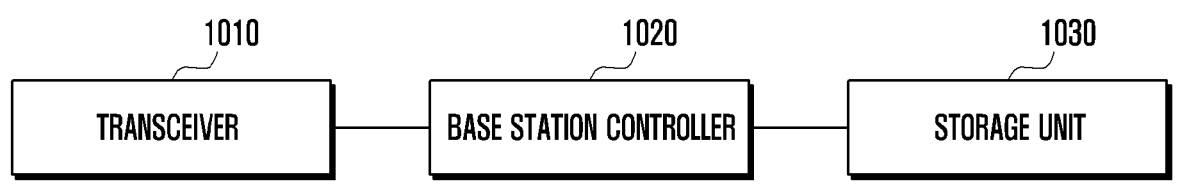
FIG. 10 is a block diagram illustrating a configuration of a base station according to a disclosed embodiment.

FIG. 10 is a block diagram illustrating a configuration of a base station according to a disclosed embodiment. FIG. 10 is a block diagram illustrating a configuration of a base station according to a disclosed embodiment. In reference to FIG. 10, the base station may include a transceiver 1010, a base station controller 1020, and a storage unit 1030. In the disclosure, the base station controller 1020 may be defined as a circuit, an application-specific integrated circuit, or at least one processor.

The transceiver 1010 may communicate signals with other network entities. For example, the transceiver 1010 may transmit downlink signals such as a reference signal for use by a terminal in beam measurement, a synchronization signal, or PDCCH. The transceiver 1010 may be provided in the form of an RF unit including a modem.

The base station controller 1020 may control overall operations of the base station as described in the above-described embodiments. For example, the base station controller 1020 may control the transceiver 1010 and the storage unit 1030 to perform the operations as described in the above-disclosed embodiments with reference to the drawings. In detail, the base station controller 1020 may change or reconfigure a beam based on beam-related information received from a terminal.

The storage unit 1030 may store at least one of information transmitted/received by the transceiver and information generated by the base station controller 1020.

Although the embodiments of the disclosure have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the disclosure.

The invention claimed is:

1. A method performed by a terminal in a wireless communication system, the method comprising:
   receiving, from a base station, a reference signal on a downlink beam;
   generating beam related information for reporting a failure of the downlink beam, in case that a beam failure is detected based on the reference signal; and
   in case that a beam correspondence is satisfied and a plurality of beam pairs are configured for the terminal, transmitting, to the base station on a beam of a beam pair, the beam related information on a physical uplink control channel (PUCCH) for periodic reporting of a beam measurement result,
   wherein the beam measurement result includes a measurement value and a differential value associated with the downlink beam, and a beam index of the downlink beam,
   wherein the beam related information indicates that the beam failure is detected and includes a scheduling request (SR), and
   wherein whether the beam correspondence is satisfied is determined based on the beam measurement result.

2. The method of claim 1,
   wherein the beam pair is selected among the plurality of beam pairs by excluding beam pair that includes the downlink beam, and
   wherein the beam related information includes candidate beam information on at least one beam to be monitored by the terminal, and the at least one beam being different from the plurality of beam pairs.

3. The method of claim 1,
   wherein a channel quality information, CQI, to be reported on the PUCCH is dropped, or
   wherein an uplink payload other than the beam related information is zero-padded for the PUCCH.

4. The method of claim 1, wherein the reference signal includes at least one of a channel state information reference signal (CSI-RS) or a synchronization signal block (SSB).

5. A method performed by a base station in a wireless communication system, the method comprising:
   transmitting, to a terminal, a reference signal on a downlink beam; and
   in case that a beam correspondence is satisfied and a plurality of beam pairs are configured for the terminal, receiving, from the terminal on a beam of a beam pair, beam related information on a physical uplink control channel (PUCCH) for periodic reporting of a beam measurement result,
   wherein the beam related information is for reporting a failure of the downlink beam, in case that a beam failure is detected based on the reference signal, wherein the beam measurement result includes a measurement value and a differential value associated with the downlink beam, and a beam index of the downlink beam, wherein the beam related information indicates that the beam failure is detected and includes a scheduling request (SR), and wherein whether the beam correspondence is satisfied is determined based on the beam measurement result.

6. The method of claim 5,
wherein the beam pair is selected among the plurality of beam pairs by excluding beam pair that includes the downlink beam, and
wherein the beam related information includes candidate beam information on at least one beam to be monitored by the terminal, and the at least one beam being different from the plurality of beam pairs.

7. The method of claim 5,
wherein a channel quality information, CQI, to be reported on the PUCCH is dropped, or
wherein an uplink payload other than the beam related information is zero-padded for the PUCCH.

8. The method of claim 5, wherein the reference signal includes at least one of a channel state information reference signal (CSI-RS) or a synchronization signal block (SSB).

9. A terminal in a wireless communication system, the terminal comprising:
a transceiver configured to transmit or receive a signal; and
a controller coupled with the transceiver configured to:
receive, from a base station, a reference signal on a downlink beam,
generate beam related information for reporting a failure of the downlink beam, in case that a beam failure is detected based on the reference signal, and
in case that a beam correspondence is satisfied and a plurality of beam pairs are configured for the terminal, transmit, to the base station on a beam of a beam pair, the beam related information on a physical uplink control channel (PUCCH) for periodic reporting of a beam measurement result,
wherein the beam measurement result includes a measurement value and a differential value associated with the downlink beam, and a beam index of the downlink beam,
wherein the beam related information indicates that the beam failure is detected and includes a scheduling request (SR), and
wherein whether the beam correspondence is satisfied is determined based on the beam measurement result.

10. The terminal of claim 9,
wherein the beam pair is selected among the plurality of beam pairs by excluding beam pair that includes the downlink beam, and
wherein the beam related information includes candidate beam information on at least one beam to be monitored by the terminal, and the at least one beam being different from the plurality of beam pairs.

11. The terminal of claim 9,
wherein a channel quality information, CQI, to be reported on the PUCCH is dropped, or
wherein an uplink payload other than the beam related information is zero-padded for the PUCCH.

12. The terminal of claim 9, wherein the reference signal includes at least one of a channel state information reference signal (CSI-RS) or a synchronization signal block (SSB).

13. A base station in a wireless communication system, the base station comprising:
a transceiver configured to transmit or receive a signal; and
a controller coupled with the transceiver configured to:
transmit, to a terminal, a reference signal on a downlink beam, and
in case that a beam correspondence is satisfied and a plurality of beam pairs are configured for the terminal, receive, from the terminal on a beam of a beam pair, beam related information on a physical uplink control channel (PUCCH) for periodic reporting of a beam measurement result,
wherein the beam related information is for reporting a failure of the downlink beam, in case that a beam failure is detected based on the reference signal,
wherein the beam measurement result includes a measurement value and a differential value associated with the downlink beam, and a beam index of the downlink beam,
wherein the beam related information indicates that the beam failure is detected and includes a scheduling request (SR), and
wherein whether the beam correspondence is satisfied is determined based on the beam measurement result.

14. The base station of claim 13,
wherein the beam pair is selected among the plurality of beam pairs by excluding beam pair that includes the downlink beam, and
wherein the beam related information includes candidate beam information on at least one beam to be monitored by the terminal, and the at least one beam being different from the plurality of beam pairs.

15. The base station of claim 13,
wherein a channel quality information, CQI, to be reported on the PUCCH is dropped, or
wherein an uplink payload other than the beam related information is zero-padded for the PUCCH.

16. The base station of claim 13, wherein the reference signal includes at least one of a channel state information reference signal (CSI-RS) or a synchronization signal block (SSB).

* * * * *